Patented Sept. 7, 1937

2,092,090

UNITED STATES PATENT OFFICE 2,092,090

CORRECTIVE METHOD OF COLORING FRUIT

Jagan N. Sharma, Riverside, Calif., assignor to Food Machinery Corporation, San Jose, Calif., a corporation of Delaware No Drawing. Application October 8, 1934, Serial No. 747,423

10 Claims. (Cl. 99—103)

This invention relates to a method whereby a desired varietal coloration may be imparted to whole fruit, provided with skins which are oily, waxy and/or water-resistant. More specifically, the invention is directed toward a method whereby whole citrus fruit may have a desired varietal coloration imparted thereto, the stem, stem ends, or stem cavities retaining their normal shade or color.

Methods of imparting a desired varietal coloration to whole fruit provided with water-repellent skins or surfaces are described in my copending applications Serial Nos. 712,831 and 731,265, filed February 24, 1934 and June 19, 1934, respectively. In such prior methods, oil-soluble coloring agents, such as dyes, are employed and whole fruit, upon being brought in contact with such coloring agents, have a desired varietal coloration imparted thereto, the coloring substance impregnating the outer layers of the skin or peel. The resultant color is thus made an integral portion of the fruit and is not removable by mechanical handling, brushing, wiping, or the like, without impairing or masking the natural texture or appearance of the skin or peel.

The method briefly described hereinabove, as well as other known methods of coloring fruit, not only imparts a desired varietal coloration to the skin or peel of the fruit but simultaneously imparts an undesired coloration to the stem, stem end or stem cavity of the fruit. In a normal fruit, such as an orange, the stem is generally of a greenish color whereas the stem cavity, if exposed, is of a yellow color which contrasts with the orange color of the peel. During the coloring process, the orange or red coloring substance used is mechanically absorbed by the stem or stem cavity and as a result the treated fruit can be distinguished from an untreated fruit by the unnatural coloration of the stem end or stem cavity.

The method of this invention results in the production of a fruit whose varietal color has been enhanced, the stems, stem ends or stem cavities of the fruit being of a natural color, or of an enhanced but natural appearance. Generally stated, the method comprises impregnating the exterior peel or skin of the fruit with a substance adapted to impart varietal color thereto in any desired manner and then subjecting the fruit to the action of a bleaching agent so as to selectively bleach the stems, stem ends or stem cavities of the fruit, thereby restoring the same to its normal color.

The bleaching agents used may be either liquid or gaseous and water soluble, and preferably not soluble in the oily or waxy constituents of the skin or peel, thereby permitting the bleaching agent to act upon the water-wettable stem portions of the fruit without affecting the skin or peel and coloring substances carried thereby. Such bleaching agents may be either oxidizing or reducing agents, depending upon the character of the coloring substance or substances used during the original treatment of the fruit. Certain of the dyes used in imparting a desired varietal color to the skin or peel of citrus fruit, such as Sudan II, are rendered colorless by reduction and therefore reducing agents may be used in the subsequent step of the process for the purpose of restoring the stem to its normal coloring.

An object of this invention, therefore, is to disclose and provide a method of imparting a desired varietal coloration to fruit without imparting an unnatural appearance to the fruit.

A further object of the invention is to disclose and provide a method whereby fruit provided with oily, waxy and/or water-repellent peel may have a desired varietal color imparted thereto and the stem, stem end or stem cavity restored to its natural color.

A still further object of the invention is to disclose and provide means and methods whereby all unnatural appearance of fruit treated for the enhancement of their varietal color can be obviated.

These and other objects, uses, adaptations and modifications of the invention will become apparent to those skilled in the art from the following detailed description of the invention, particular reference being made to the treatment of citrus fruit.

As briefly stated hereinabove, the color substances used in the treatment of whole fruit for the purpose of enhancing their varietal color are substances which result in the impregnation of the skin or peel with the desired color. The skin or peel of a citrus fruit is water-repellent and contains oils and waxes. Oil-soluble dyes are most effective in the treatment of citrus fruit as these dyes impregnate and enter the oily water-repellent peel whereas water-soluble dyes simply become absorbed in the stem or in the cut water-wettable portions of the skin.

During treatment of an orange with an oil-soluble dye (either in colloidal suspension in an aqueous medium or in solution in an oleaginous medium) a considerable quantity of the dye is mechanically absorbed by or retained by the stem end, stem or stem cavity of the fruit. This is the undesirable effect which is cured or eliminated by this invention.

The oil-soluble dyes normally used in the treatment of citrus fruit may be subdivided into two groups, namely, those dyes which are oxidizable and which upon oxidation are rendered colorless or substantially so, and those dyes which may be rendered substantially colorless by reduction. Dyes such as yellow AB, yellow OB, phosphine, and nitroso amine are illustrative of oxidizable dyes. Sudan II, orange 30 (interstate Color), and benzine-azo-beta-naphthol (acid orange) are illustrative of dyes which may be rendered colorless by reduction.

The oxidizing or reducing agents used in selectively bleaching the treated fruit may be either liquid or gaseous. Sodium hypochlorite, hydrogen peroxide, sulfur dioxide and sodium-sulfon-para-toluene chloramine are illustrative of oxidizing agents which can be used. Copper sulfate, ferrous sulfate, ferrous sulfite, hydrogen sulfide, titanous chloride and stannous chloride are illustrative of some reducing agents which may be used, the proportions or concentrations of the reducing agents being varied greatly. When sodium hypochlorite is used, an 0.3 per cent to 0.6 per cent solution has been found entirely satisfactory. Stannous chloride solutions of 0.5 per cent strength are satisfactory. The 0.1 per cent of titanium chloride or a 2 to 5 per cent solution of copper sulfate may be used.

It is to be noted that the oxidizing or reducing agent used should preferably be insoluble in the oils and waxes of the skin or peel of the fruit to which it is to be applied, thereby permitting the selective action to take place upon the stem, stem end or stem cavity of the fruit.

The entire process can be carried out as follows: Whole citrus fruit, after being washed for removal of extraneous matter, dirt, etc., may be passed through a bath or otherwise brought in contact with a suitable coloring medium, such as for example a colloidal suspension of Sudan II in an aqueous medium containing a surface tension reducing agent. Fruit is maintained in contact with the color imparting suspension for a suitable length of time (generally less than 5 minutes) and then removed from such contact. Excess of the color imparting agent is then removed from the exterior surfaces of the fruit, either by rinsing, wiping or brushing. The fruit may then be sprayed, dipped into or otherwise contacted with the bleaching agent. In this particular example, when Sudan II is used, a 2 to 5 per cent solution of copper sulfate was brought into contact with the colored fruit for a period of about 30 seconds, this contact resulting in the complete bleaching of all dye carried by the stem ends, stems or stem cavities of the fruit. Copper sulfate is eminently suited for use in this process because of its inherent blue-green color, which appears to enhance the natural appearance of the stemmed portion of the fruit.

After this treatment the fruit may be rinsed with water and passed through the normal fruit treating process of moisture removal, drying, waxing, brushing, sorting, wrapping and packing.

In the event the bleaching agent does not restore the stem portions of the fruit to a condition entirely suited to the requirements of the operator, the bleaching solution may either contain a suitable water-soluble green or other dye with which the stem portions may be selectively colored so as to enhance their natural color and create the desired effect, or after subjecting the fruit to the action of the bleaching agent the fruit may be rinsed with a water-soluble, dye-containing medium for the purpose of enhancing the natural color of the stem portions of the fruit. Green FCF, Guinea green, anthraquinone (Ogilvie type and others) and trisazo dyes are suitable for this purpose.

Although the invention has been described in considerable detail, it is to be understood that it is not limited to the use of the specific ingredients, dyes, bleaching agents, etc., specified as the materials enumerated hereinabove are simply indicative of the classes and types of substances which may be utilized in carrying out the invention. All such changes and modifications as come within the scope of the appended claims are embraced thereby.

I claim:

1. A method of treating whole citrus fruit, said fruit containing an added coloring substance in the stem portions thereof, comprising subjecting the fruit to the action of an aqueous medium containing a bleaching agent adapted to react with the coloring substance present in the stem portion of the fruit to render the same innocuous and restore the natural appearance thereof.

2. A method of treating whole citrus fruit, said fruit containing an added coloring substance in the stem portions thereof, comprising subjecting the fruit to the action of substantially oil-insoluble bleaching agent adapted to selectively act upon the stem portion but not the peel thereof to restore the appearance of said stem portion, and then subjecting the fruit to the action of a water-soluble dye adapted to impregnate the stem portion and enhance the natural appearance thereof.

3. A method of treating whole citrus fruit, said fruit containing an oil-soluble dye capable of bleaching by oxidation in the peel and stem portions thereof, comprising subjecting said fruit to the action of an oil-insoluble oxidizing agent adapted to selectively and effectively act upon the stem portion of the fruit to render said dye innocuous at said stem portion without acting upon the peel of the fruit.

4. A method of treating whole citrus fruit, said fruit containing an oil-soluble dye capable of bleaching by oxidation in the peel and stem portions thereof, comprising subjecting said fruit to the action of an oil-insoluble oxidizing agent adapted to selectively and effectively act upon the stem portion of the fruit to render said dye innocuous at said stem portion without affecting the dye in the peel of said fruit, and then subjecting the fruit to the action of a water-soluble dye adapted to impregnate the stem portion and enhance the natural appearance thereof.

5. A method of treating whole citrus fruit, said fruit containing an added oil-soluble dye capable of bleaching by reduction in the peel and stem portions thereof, comprising subjecting said fruit to the action of an oil-insoluble reducing agent adapted to selectively and effectively act upon the stem portion of the fruit to render said dye innocuous at said stem portion without acting upon the peel of said fruit.

6. A method of treating whole citrus fruit, said fruit containing an added oil-soluble dye capable of bleaching by reduction in the peel and stem portions thereof, comprising subjecting said fruit to the action of an oil-insoluble reducing agent adapted to selectively and effectively act upon the stem portion of the fruit to render said dye innocuous at said stem portion without affecting the dye in the peel of said fruit, and then subjecting the fruit to the action of a water-soluble dye adapted to impregnate the stem portion and enhance the natural appearance thereof.

7. In a method of enhancing the natural varietal color of whole citrus fruit, the steps of: impregnating the skin or peel of the fruit with a coloring substance adapted to impart a varietal color thereof, and then subjecting the fruit to the conjoint action of an aqueous solution containing a substantially oil-insoluble bleaching agent adapted to selectively act upon the stem portion of the fruit, and a water-soluble dye adapted to selectively impregnate said stem portion to enhance the natural appearance thereof.

8. In a method of treating whole citrus fruit containing an added oil-soluble dye in the peel and stem portions thereof, the step of subjecting the fruit to a bleaching agent to selectively and effectively render the added dye innocuous at said stem portion without affecting the dye in the peel of the fruit.

9. A method of treating whole citrus fruit, said fruit containing an added coloring substance in the stem portions thereof, comprising subjecting the fruit to the action of a substantially oil-insoluble bleaching agent adapted to selectively act upon the stem portion thereof to restore the same to its natural color without acting upon the skin or peel of the fruit.

10. A method of treating whole citrus fruit which have previously been subjected to the action of a coloring substance adapted to impart a varietal color to the skin or peel of the fruit, said fruit containing an added coloring substance in the stem portion thereof, comprising subjecting said fruit to the action of a substantially oil-insoluble but water-soluble bleaching agent adapted to selectively and effectively act upon the stem portion of the fruit to restore the same to its natural color without acting upon the skin or peel of the fruit.

JAGAN N. SHARMA.